(12) United States Patent
Chou

(10) Patent No.: US 7,483,082 B2
(45) Date of Patent: Jan. 27, 2009

(54) METHOD AND SYSTEM FOR AUTOMATIC COLOR HUE AND COLOR SATURATION ADJUSTMENT OF A PIXEL FROM A VIDEO SOURCE

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 810 days.

(21) Appl. No.: 11/112,816

(22) Filed: Apr. 21, 2005

(65) Prior Publication Data

US 2006/0238655 A1  Oct. 26, 2006

(51) Int. Cl.
*H04N 9/64* (2006.01)
*H04N 9/68* (2006.01)

(52) U.S. Cl. .................. 348/645; 348/649; 348/453; 348/630; 348/448; 382/167

(58) Field of Classification Search ................. 348/645, 348/649, 630, 453, 448, 612, 617, 624; 345/600, 345/589, 590; 382/167; 358/518, 520
See application file for complete search history.

(56) References Cited

U.S. PATENT DOCUMENTS

| | | | |
|---|---|---|---|
| 5,450,216 A | 9/1995 | Kasson | |
| 5,450,500 A | 9/1995 | Brett | |
| 5,737,032 A | 4/1998 | Stenzel et al. | 348/649 |
| 6,028,646 A * | 2/2000 | Jeong et al. | 348/645 |
| 6,122,012 A | 9/2000 | Segman | 348/576 |
| 6,683,982 B1 | 1/2004 | Kohn | 382/167 |
| 6,711,289 B1 * | 3/2004 | Sakamoto | 382/167 |
| 6,724,435 B2 | 4/2004 | Segman | 348/576 |
| 6,992,683 B2 * | 1/2006 | Shin et al. | 345/589 |
| 7,042,520 B2 * | 5/2006 | Kim | 348/645 |
| 7,042,521 B2 * | 5/2006 | Kim | 348/645 |
| 7,193,659 B2 * | 3/2007 | Huang et al. | 348/649 |
| 7,327,404 B2 * | 2/2008 | Chen et al. | 348/654 |
| 7,405,771 B2 * | 7/2008 | Lee et al. | 348/645 |
| 2003/0068080 A1 * | 4/2003 | Lu | 382/162 |
| 2004/0013298 A1 * | 1/2004 | Choe et al. | 382/167 |
| 2004/0234126 A1 | 11/2004 | Hampshire, II et al. | |
| 2005/0185839 A1 * | 8/2005 | Matsubara | 382/167 |
| 2006/0072172 A1 * | 4/2006 | Loew | 358/518 |

* cited by examiner

*Primary Examiner*—David L Ometz
*Assistant Examiner*—Jean W Désir
(74) *Attorney, Agent, or Firm*—Pinnacle Patent Law Group

(57) ABSTRACT

A method for automatically adjusting chrominance data of an input pixel from a color video signal includes receiving and temporarily storing the chrominance data of the input pixel in a transmission format comprising a color difference representation and converting the chrominance data from the color difference representation in Cartesian coordinates to color hue and color saturation representation in polar coordinates such that color attributes of the input pixel can be analyzed according to hue and saturation values. The method also includes determining a hue adjustment value and a saturation adjustment value based on the color hue value and color saturation value associated with the chrominance data, applying the hue adjustment and the saturation adjustment directly to the chrominance data in its transmission format, and outputting the adjusted chrominance data to an output color video signal.

14 Claims, 8 Drawing Sheets

CbCr Color Plane

θ-ρ Color Plane

METHOD AND SYSTEM FOR AUTOMATIC COLOR HUE AND COLOR SATURATION ADJUSTMENT OF A PIXEL FROM A VIDEO SOURCE

FIELD OF THE INVENTION

The present invention relates in general to digital image and video signal processing and in particular to a digital signal processing method and system for automatically adjusting, correcting, and enhancing the color hue and the color saturation of a pixel from a color video source.

BACKGROUND OF THE INVENTION

Color is a property of light that depends on wavelength. When light falls on an object, some of it is absorbed and some is reflected. The apparent color of an opaque object depends on the wavelength of the light that it reflects; e.g., a red object observed in daylight appears red because it reflects only the waves producing red light. The color of a transparent object is determined by the wavelength of the light transmitted by it. An opaque object that reflects all wavelengths appears white; one that absorbs all wavelengths appears black. Therefore, black is said to result from the absence of color, and white from the presence of all colors mixed together.

Colors whose beams of light in various combinations can produce any of the color sensations are called primary, or spectral, colors. The process of combining these colors is said to be "additive," i.e., the sensations produced by different wavelengths of light are added together. The additive primaries are red, green, and blue-violet. White can be produced by combining all three primary colors.

FIG. 1A is an illustration of a classic RGB color cube. The color cube represents the "additive" property of colors. Each vertex along an axis represents a primary color, i.e., red (x-axis), green (y-axis) and blue (z-axis). Other vertexes of the cube represent the secondary color resulting from the combination of primary colors. For example, a combination of red and green produces yellow, and a combination of all three primary colors produces white.

The scientific description of color involves the specification of all relevant properties of a color either subjectively or objectively. The subjective description gives the hue, saturation, and intensity of a color. Hue refers to what is commonly called color, i.e., red, green, blue-green, orange, etc. Saturation refers to the richness of a hue as compared to a gray of the same brightness. Intensity refers to the lightness or brightness of a color or a gray. A subjective color notation system provides comparison samples of colors rated according to these three properties of hue, saturation and intensity. This system is more intuitive or qualitative where color manipulation is more consistent with how humans perceive and interpret color.

In an objective system for color description, the corresponding properties are described by quantitative factors, such as wavelength, purity and luminance. The objective system is more suitable for describing "color" to and through an inanimate object, such as a computer chip, a television display, or other electronic devices. For instance, in digital imaging, colors can be represented by discrete combinations of red, green and blue (RGB) signals. In some instances, color can be represented by digitized samples of luminance (Y) and two color differences (Cb and Cr), where Y is related to the weighted total of the RGB signals and Cb and Cr represent the scaled and offset color difference signals B-Y and R-Y, respectively.

In video standards for standard-definition (SD) and high-definition (HD) video signal transmission, a video signal is represented by digitized samples of digital luminance, Y, and the color differences, Cb and Cr. The digital luminance and color difference values (Y, Cb, Cr) can be derived from the three primary analog signals representing RGB, i.e., $E'_R$, $E'_G$, and $E'_B$, according to world-wide video standards set forth in ITU-R BT.601 and ITU-R BT.709. Each of the values (Y, Cb, Cr) in the luminance/color differences color space is a function of all three primary analog values in the other (R, G, B) color space.

Typically, a digital color video signal transmitted in a luminance/color differences format, such as (Y, Cb, Cr), is converted to the (R, G, B) format by a receiving device so that the signal can be displayed by the device. Because of the inter-related nature of the variables, i.e., each variable in either color space is a function of all three variables in the other color space, the standard digital video formats, (R, G, B) and (Y, Cb, Cr), can be related by a set of color space conversion formulae. Basically, each variable in either color space can be calculated from all three variables in the other color space after linear transformation, quantization, and offsetting.

It may be desirable to modify the digital video signal somewhere in the transmission and/or reception paths before displaying the signal on the display device. For instance, such modifications can be used to:

correct color hue shift and color saturation distortion during analog transmission and reception of the video signal compensate for the differences in color gamut, i.e., the extent of the colors that can be displayed, of different display devices utilizing different display technologies, such as cathode-ray tube (CRT), liquid crystal display (LCD), digital micro-mirror device (DMD), and plasma display panel (PDP), in order to achieve consistent displayed color; and enhance a viewer's viewing experience by displaying color adjusted to the viewer's preferences and tastes.

Color pixel data in the digital color video signal can be modified directly by digital computation. Because the transmission formats as described above are luminance (Y) and color differences (Cb and Cr), it is desirable to modify the color pixel data in (Y, Cb, Cr) format by digital computation. Digital processing provides several advantages that are appropriate for the processing of digital video signals in the (Y, Cb, Cr) format. For example: (1) the resolution in a digital computation is a function of the level of quantization, so higher resolution of pixel data, which means higher visual quality, can be achieved with higher bit widths for the representation and the computation of pixel data; (2) non-linear and adaptive algorithms that are difficult or impossible to realize in an analog system can be efficiently and reliably implemented in video signal processing units to achieve superior visual quality; and (3) the characteristics of a video signal processing unit can be fine-tuned easily and promptly by programming its coefficients and/or parameters.

Pixel data values in the standard digital video formats, e.g., (Y, Cb, Cr) and (R, G, B), are represented by variables in Cartesian coordinates. While this makes digital processing easier, it is well recognized that the chromatic portion of the pixel data value, e.g., (Cb, Cr), carry less subjective meaning to the way humans perceive and interpret color. In other words, humans tend not to perceive or describe color in color difference value (Cb, Cr) terms. Accordingly, modifying color difference, i.e., Cb, Cr, values is not intuitive to a viewer.

As stated above, humans are receptive to subjectively oriented color space representations, such as hue, saturation, and intensity (HSI). HSI color representations are more intuitive in manipulating color and are more consistent with the way humans perceive and interpret color. The conversion between color differences representation (Cb, Cr) and hue/saturation representation, however, involves trigonometric functions such as sine, cosine, and arc tangent. These trigonometric conversions are time-consuming and/or require expensive computational resources.

Accordingly, it is desirable to provide a method and system for controllably altering the characteristics of a digitally encoded video signal with respect to color hue and color saturation. The method and system should not require extensive computational resources and should be efficient.

SUMMARY OF THE INVENTION

In one version, a method for automatically adjusting chrominance data of an input pixel from a color video signal includes receiving and temporarily storing the chrominance data of the input pixel in a transmission format comprising a color difference representation and converting the chrominance data from the color difference representation in Cartesian coordinates to color hue and color saturation representation in polar coordinates such that color attributes of the input pixel can be analyzed according to hue and saturation values. The method also includes determining a hue adjustment value and a saturation adjustment value based on the color hue value and color saturation value associated with the chrominance data, applying the hue adjustment and the saturation adjustment directly to the chrominance data in its transmission format, and outputting the adjusted chrominance data to an output color video signal.

In another aspect, a color management module for automatically adjusting chrominance data of an input pixel from a color video signal includes a buffer that receives and temporarily stores the chrominance data of the input pixel in a transmission format comprising a color difference representation, a conversion module for converting the chrominance data from the color difference representation in Cartesian coordinates to color hue and color saturation representation in polar coordinates, a decision module coupled to the conversion module for determining a hue adjustment value and a saturation adjustment value based on the color hue value and color saturation value associated with the chrominance data, and an adjustment module coupled to the buffer and to the decision module for applying the hue adjustment value and the saturation adjustment value directly to the chrominance data in its transmission format and for outputting the adjusted chrominance data to an output color video signal.

DESCRIPTION OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION OF THE INVENTION

The present invention relates in general to digital image and video signal processing and in particular to a digital signal processing method and system for automatically adjusting, correcting, and enhancing the color hue and the color saturation of each pixel from a color video source. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to a version of the present invention, the color space of an input video signal is partitioned into a plurality of color tone regions defined on a two-dimensional color space indexed by color hue, θ, and color saturation, ρ. The hue and saturation values are converted from input color difference values (Cb, Cr), using a computation-efficient algorithm. The color hue and color saturation values of the pixel data in each color tone region are individually controlled and adjusted according to predetermined rules by using predetermined lookup tables defined for each color tone region. The hue and saturation adjustments are applied directly to the chrominance portion of the input pixel data in its (Cb, Cr) format and the adjusted chrominance pixel data is then displayed. In this manner, the displayed color is corrected for transmission errors, compensated for display device discrepancies, and enhanced for a more pleasing viewing experience.

Figure 1A:
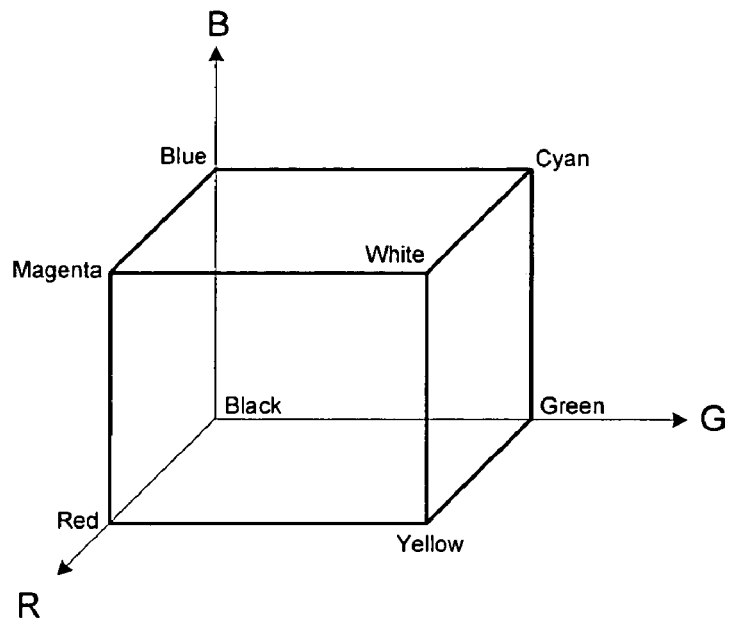
FIG. 1A is a view of an exemplary RGB color cube.
Figure 1B:
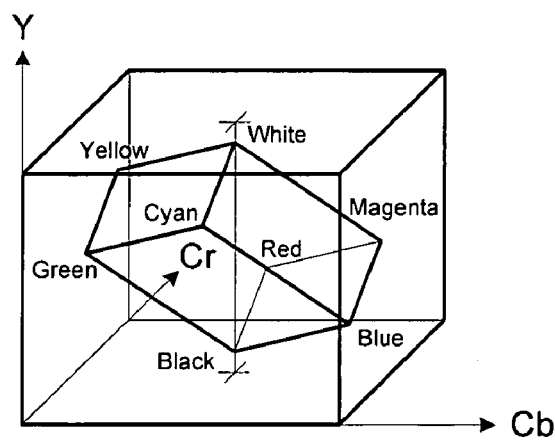
FIG. 1B is a view of an exemplary YCbCr color cube.
Figure 1C:
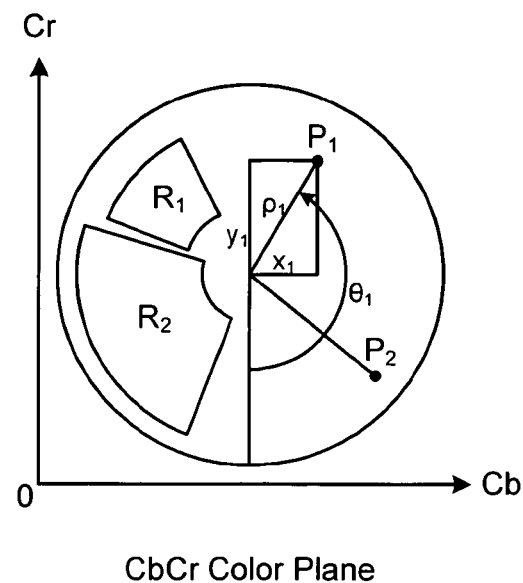
FIG. 1C is a view of the CbCr color plane

FIG. 1B is an illustration of a three dimensional YCbCr color cube. Illustrated within the YCbCr color cube is a transformed and skewed RGB parallelogram, which graphically illustrates the mathematical relationship between the (Y, Cb, Cr) color space and the (R, G, B) color space. Within the YCbCr color cube, only those points indexed by (Y, Cb, Cr) inside the RGB parallelogram correspond to valid points indexed by (R, G, B) in the RGB color cube. Both color spaces are represented by Cartesian coordinates. FIG. 1C illustrates a two-dimensional view of the CbCr color plane where the Y axis extends perpendicularly out and intersects the black and white vertexes of the RGB parallelogram. With Cartesian coordinates, the color plane is partitioned into a square grid indexed by (Cb, Cr). In the CbCr color plane, each color can be represented by Cb and Cr coordinates.

Figure 1D:
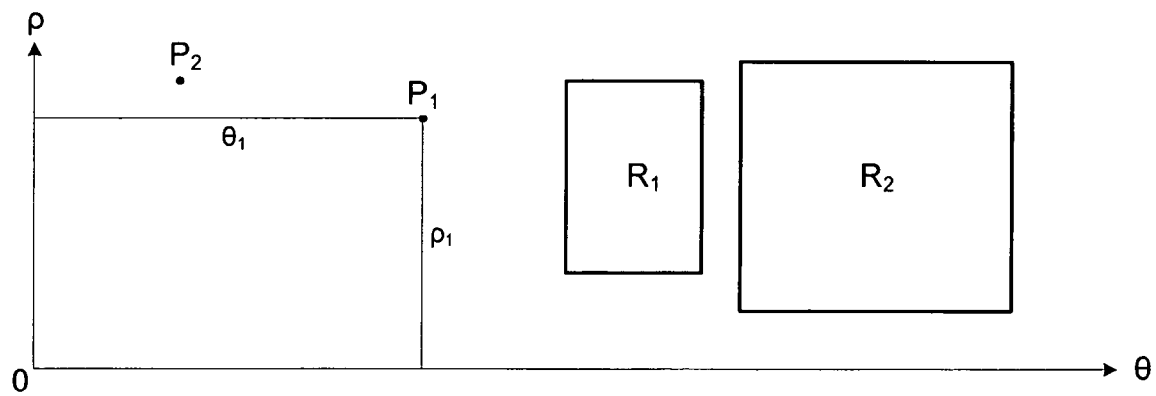
FIG. 1D is a view of the θ-ρ color plane.

Alternatively, colors can be represented by a vector, V, having a phase angle, θ, and a scaled magnitude, ρ. With polar coordinates, the CbCr color plane is partitioned into a polar grid with sectors indexed by (θ, ρ). In the θ-ρ color plane illustrated in FIG. 1D, each color is described by its phase angle, θ, which represents its hue, and its scaled magnitude, ρ, which represents its saturation. Also illustrated in FIG. 1C and FIG. 1D are two color pixel data points $P_1$ and $P_2$ and two color tone regions $R_1$ and $R_2$ defined on both CbCr and θ-ρ color planes, respectively. As can be seen from FIG. 1C, a color pixel data point indexed by (Cb, Cr) on the CbCr color plane is indexed by (θ, ρ) on the θ-ρ color plane of FIG. 1D. Similarly, a color tone region defined on the CbCr color plane as a sector (FIG. 1C) is defined on the θ-ρ color plane as a rectangle (FIG. 1D). For a color pixel data point, the relationship between its hue (θ), saturation (ρ), and Cb and Cr is:

$$\theta = \arctan(y/x)$$

$$\rho = (x^2 + y^2)^{1/2}$$

where x=Cb−128 and y=Cr−128. The value 128 represents zero chrominance values in Cb and Cr, as will be described in more detail below.

As stated above, humans intuitively perceive and interpret color according to hue and saturation, as opposed to color differences, e.g., Cb, Cr. Thus, displayed color should be adjusted with respect to hue and saturation. The conversion from color differences representation (Cb, Cr) to hue/saturation representation (θ, ρ), however, requires expensive computational resources to perform real-time mathematical operations, such as multiplication, square-root, division, and arctangent. Such computational resources typically are not available in standard display devices, such as a television, without significant associated costs.

According to a preferred version of the present invention, a color management module receives and buffers the chrominance (color) data, e.g., Cb, Cr, of a pixel in a color video signal, converts the color data from color differences values (Cb, Cr) to hue and saturation values (θ, ρ), determines automatically how much, if at all, the hue and/or saturation should be adjusted, applies the adjustment directly to the buffered color data (Cb, Cr) and outputs the adjusted color data (Cb', Cr') to a display or another component in the display device.

Figure 2:
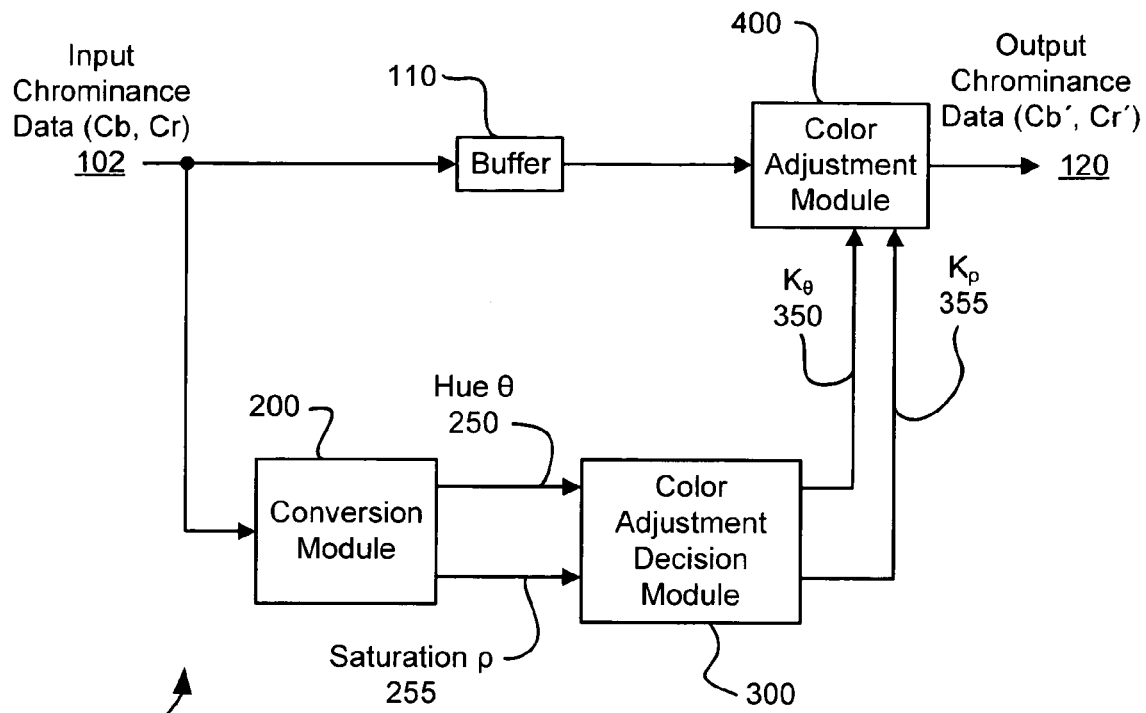
FIG. 2 is an block diagram of color management module according to a version of the present invention.
Figure 3:
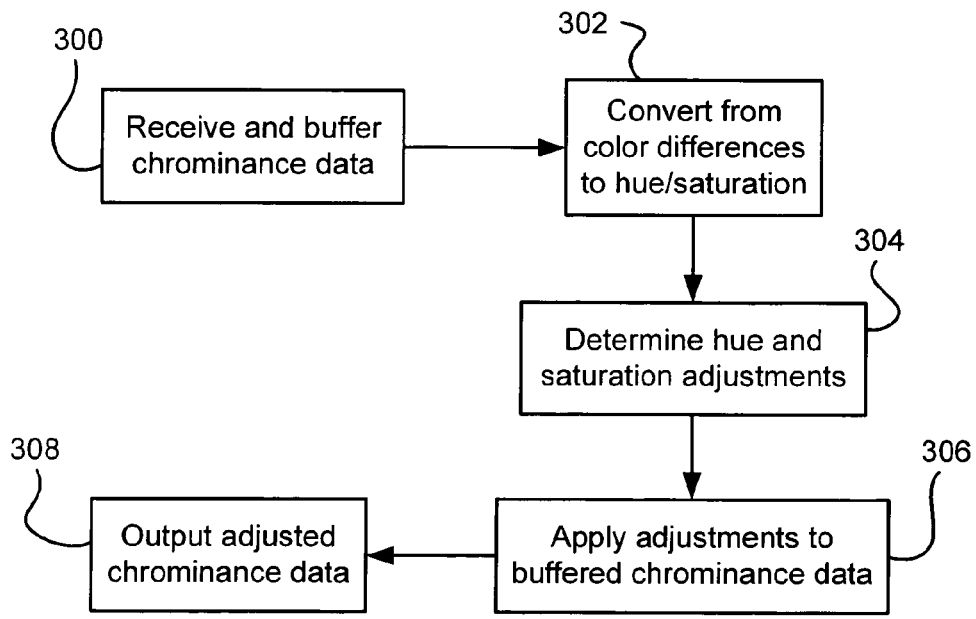
FIG. 3 is a flowchart illustrating a method of automatically adjusting color data in a pixel in relation to hue and saturation using the color management module 100 shown in FIG. 2 according to a version of the present invention.

FIG. 2 is a block diagram of the color management module 100 according to a version of the present invention. The module 100 includes a conversion module 200, a color adjustment decision module 300 and a color adjustment module 400. FIG. 3 is a flowchart illustrating a method of automatically adjusting color data in a pixel in relation to hue and saturation using the color management module 100 shown in FIG. 2 according to a version of the present invention. Referring to FIG. 2 and FIG. 3, the color management module 100 receives the chrominance data 102, which is in the form of color differences values, Cb and Cr, and temporarily stores the data 102 in a buffer 110 (step 300).

The input chrominance data 102 is then passed to the conversion module 200 where the chrominance data 102 is converted from Cartesian color differences values, Cb and Cr, to polar hue (θ) and saturation (ρ) values (step 302). The hue and saturation values corresponding to the chrominance data 102 are received by the color adjustment decision module 300, which automatically determines a hue adjustment value, $K_\theta$, and a saturation adjustment value, $K_\rho$, based on the hue and saturation values corresponding to the chrominance data 102 (step 304). In a preferred version, the hue adjustment value, $K_\theta$, and the saturation adjustment value, $K_\rho$, indicate how much, if at all, the hue value and the saturation value should be adjusted, respectively.

The hue adjustment value $K_\theta$ and the saturation adjustment value $K_\rho$ are received by the color adjustment module 400, which also retrieves the corresponding chrominance data 102 from the buffer 110. The buffer 110 introduces a matching delay into the chrominance data 102 to compensate for the total processing time of the conversion module 200 and color adjustment decision module 300, so the hue adjustment $K_\theta$ and saturation adjustment $K_\rho$ values and the chrominance data 102 with which they are associated can reach the color adjustment module 400 simultaneously. The color adjustment module 400 applies an adjustment algorithm using the hue adjustment $K_\theta$ and saturation adjustment $K_\rho$ values directly to the chrominance data 102 (step 306), which is represented by the color differences values, Cb and Cr. The color adjustment module 400 then outputs the adjusted chrominance data values, Cb' and Cr' (120) in step 308.

According to a preferred version of the present invention, the color characteristics of a digitally encoded video signal are controllably altered with respect to color hue and color saturation. By adjusting with respect to color hue and color saturation instead of color differences, the alteration is more consistent with how humans perceive and interpret color. By using a color hue and saturation adjustment algorithm according to the present invention, the color hue and color saturation of the input chrominance data 102 can be individually and independently adjusted in the color differences (Cb, Cr) representation directly. With color hue and color saturation adjustment performed directly in the (Cb, Cr) representation, high data resolution is maintained without requiring precise Cartesian-to-polar and polar-to-Cartesian coordinate conversions concatenated in series.

Figure 4:
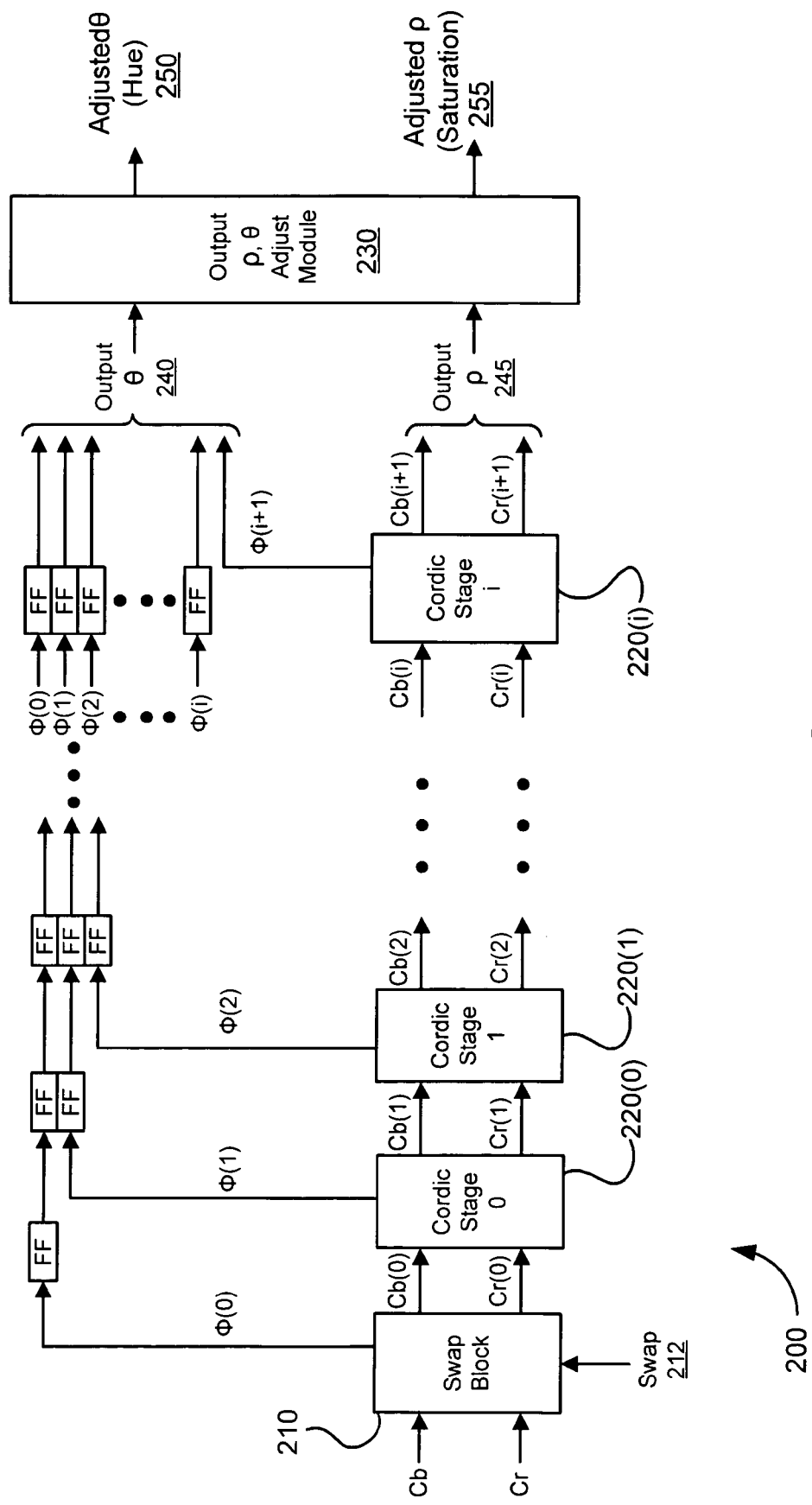
FIG. 4 is a block diagram of the conversion module according to a version of the present invention.

A preferred version of the present invention will now be described in more detail with reference to FIGS. 4-9. FIG. 4 is a block diagram of the conversion module 200 according to a version of the present invention. As stated above, the conversion module 200 converts the input chrominance data 102 from color difference representation in Cartesian coordinates (Cb, Cr) to color hue θ and color saturation ρ representation in polar coordinates (θ, ρ). According to a preferred embodiment, the conversion is performed by using a modified Coordinate Rotation and Digital Computer (CORDIC) algorithm.

The CORDIC algorithm was first developed in 1959 by Jack E. Volder for calculating trigonometric functions, multiplication, division and conversion between binary and mixed radix number systems. The CORDIC algorithm provides an iterative method of performing vector rotations by arbitrary angles using only shifts and additions. In a vectoring mode, the CORDIC algorithm rotates an input vector through whatever angle is necessary to align a result vector with the x axis. The result of the vectoring operation is a rotation angle and the scaled magnitude of the original vector. In vectoring mode, the CORDIC equations are:

$$X_{i+1} = X_i - Y_i d_i 2^{-i} \tag{1}$$

$$Y_{i+1} = Y_i + X_i d_i 2^{-i} \tag{2}$$

$$Z_{i+1} = Z_i - d_i \arctan(2^{-i}) \tag{3}$$

where $d_i = +1$ if $Y_i < 0$, and −1 otherwise, which provides the following results after n iterations:

$$X_n = A_n (X_0^2 + Y_0^2)^{1/2}$$

$$Y_n = 0$$

$$Z_n = Z_0 + \arctan(Y_0/X_0)$$

where $A_n$=rotator gain=$\Pi(1+2^{-2i})^{1/2}$.

The CORDIC algorithm generally produces one additional bit of accuracy for each iteration. For further discussion on the CORDIC algorithm, please see "A Survey of CORDIC Algorithms for FPGA Based Computers," Ray Andraka, *Proceedings of the* 1998 *ACM/SIGDA Sixth International Symposium on Field Programmable Gate Arrays*, Feb. 22-24, 1998, Monterey, Calif. pp 191-200.

The conversion module 200 preferably includes a swap block 210, a plurality of Cordic stages 220(0)-220(i), and an output adjust module 230. The swap block 210 receives a swap bit 212. The swap bit 212 is a control parameter and determines whether the input color difference values, Cb and Cr, are swapped for the purpose of shifting "discontinuities" in the θ-ρ plane. For example, if the color difference values are swapped, then a discontinuity originally in the negative Cr axis (θ=+270 degrees) is shifted to the negative Cb axis (θ=+180 degrees). This feature is useful if a discontinuity fails within one of a plurality of predetermined color tone regions. By swapping the color difference values, the discontinuity can be shifted to another region of the θ-ρ plane that does not include any one of the plurality of predetermined color tone regions.

Figure 5:
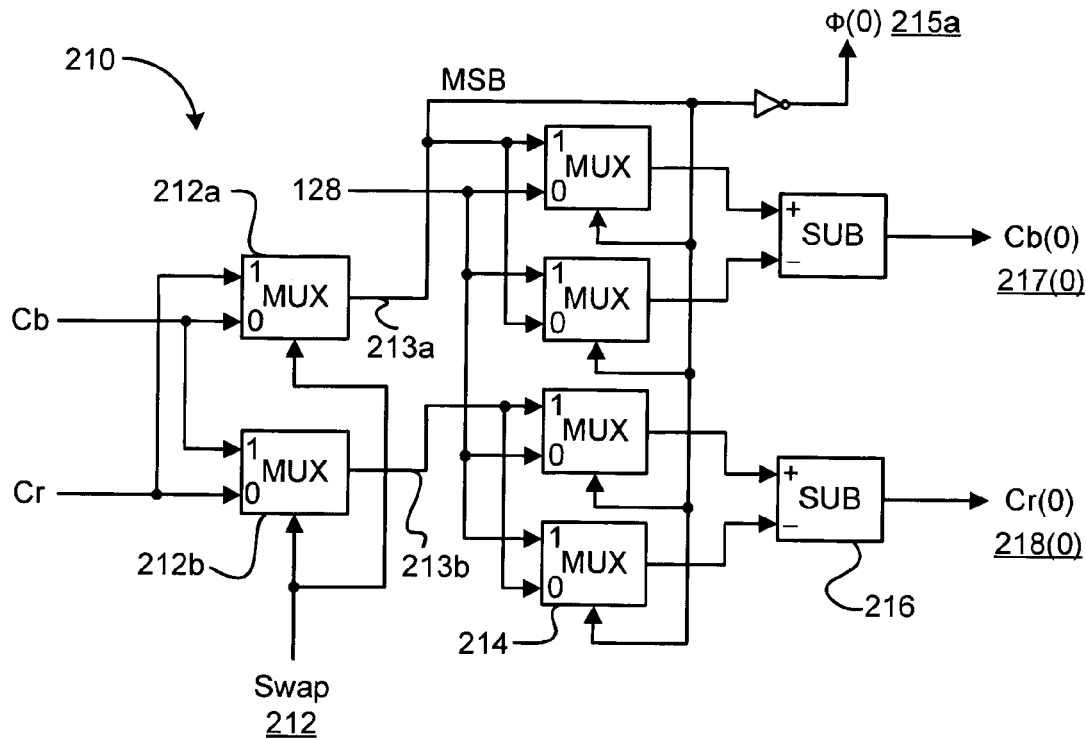
FIG. 5 is a block diagram of the swap block according to a version of the present invention.

FIG. 5 is a block diagram of the swap block 210 according to a version of the present invention. As is shown, each color difference value, Cb and Cr, is received by both multiplexers 212a, 212b, which also receive the swap bit 212. If the swap bit 212 equals zero (0), the color difference values will not be swapped, i.e., the output of the multiplexer 212a will be Cb and the output of the multiplexer 212b will be Cr. If the swap bit 212 equals one (1), the color difference values will be swapped, i.e., the output of the multiplexer 212a will be Cr and the output of the multiplexer 212b will be Cb.

In a preferred embodiment, if the swap bit 212 equals zero (0), the swap block 210 determines whether the color difference value associated with Cb, i.e., B-Y, is positive or negative. If the swap bit 212 equals one (1), the swap block 210 determines whether the color difference value associated with Cr, i.e., R-Y, is positive or negative. In the digital video data formats described in ITU-R BT.601 (SDTV) or ITU-R BT.709 (HDTV) specifications, luminance, Y, is represented by an 8-bit unsigned integer, where its nominal range is from 16 (black level) to 235 (white level) with values from 1 to 15 as footroom and values from 236 to 254 as headroom. Values 0 and 255 are reserved for synchronization only. Similarly, the chrominance values, Cb and Cr, are represented by an 8-bit unsigned integer, where each of its nominal ranges is from 16 (minimum value) to 240 (maximum value), and value 128 represents zero chrominance—where no color difference signal is present. Accordingly, the Cb and Cr number representation is a scaled and shifted version of the corresponding color difference signals.

The swap block 210 determines whether the output ($Cb_{out}$) 213a of multiplexer 212a is larger or smaller than 128. If the $Cb_{out}$ 213a is greater than 128, then $$Cb(0)=Cb_{out}-128$$

$$Cr(0)=Cr_{out}-128$$

$$\phi(0)=0$$

If $Cb_{out}$ 213a is less than 128, then $$Cb(0)=128-Cb_{out}$$

$$Cr(0)=128-Cr_{out}$$

$$\phi(0)=1$$

In this manner, the Cb(0) output 217a of the swap block 210 will always be non-negative for the plurality of cordic stages 220(i) downstream.

Figure 6:
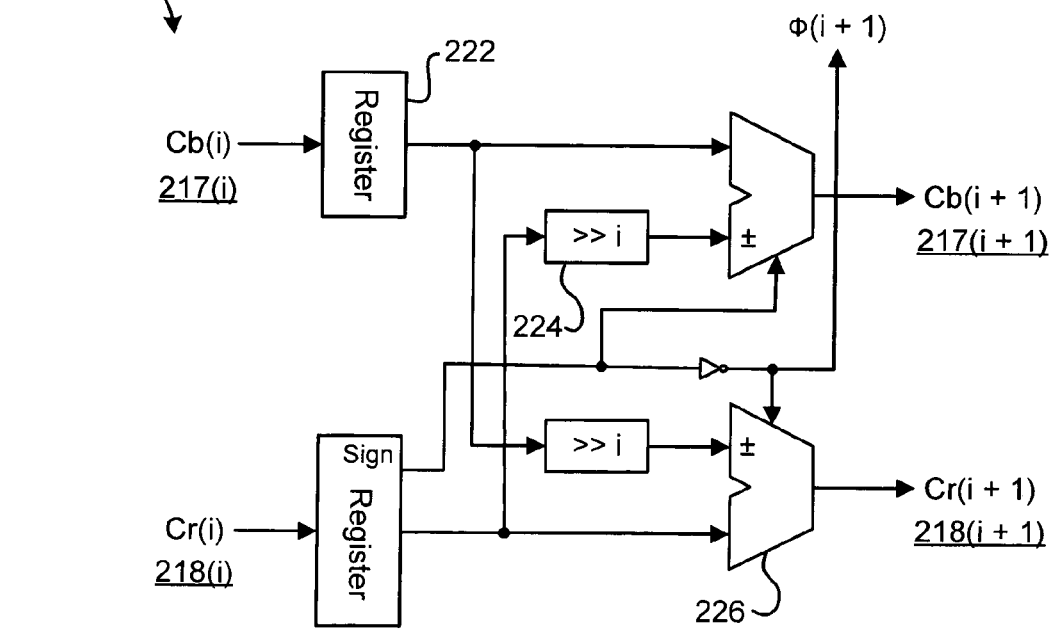
FIG. 6 is a block diagram of a Cordic stage according to a preferred version of the present invention.

FIG. 6 is a block diagram of a Cordic stage, e.g., 220(i), according to a preferred version of the present invention. As is shown, the Cordic stage 220(i) receives Cb(i) 217a and Cr(i) 218a values from a previous Cordic stage 220 (I-1) or from the swap block 210 if the Cordic stage is the first (zero) stage 220(0). According to the CORDIC algorithm, the vector rotation is performed using shift blocks 224 and add/subtract blocks 226. For example, if Cr(i)≧0:

$$Cb(i+1)=Cb(i)+2^{-i}Cr(i)$$

$$Cr(i+1)=Cr(i)-2^{-i}Cb(i)$$

$$\phi(i+1)=1$$

else:

$$Cb(i+1)=Cb(i)+2^{-i}Cr(i)$$

$$Cr(i+1)=Cr(i)-2^{-i}Cb(i)$$

$$\phi(i+1)=0$$

Referring again to FIG. 4, the number of Cordic stages 220(i) corresponds to the number of iterations performed using the CORDIC algorithm. The resolution of the polar representation is determined by the bit widths of θ and ρ and by the number of iterations. Thus, if desired, each unique combination of Cb and Cr with a predetermined bit width can be converted into a unique combination of θ and ρ without any loss of resolution by using sufficient number of iterations.

In a preferred embodiment, seven (7) Cordic stages 220(0)-220(6) are utilized to generate an output θ 240 comprised of bits from φ(0) to φ(7) and an output ρ 245. The output ρ 245 is the magnitude of the input vector scaled by a constant factor. The output θ 240 is an 8-bit unsigned representation of the angle of the input vector in binary arctangent base, as opposed to binary base. By adopting the output θ 240 in the binary arctangent base, equation (3) of the CORDIC algorithm:

$$Z_{i+1}=Z_i-d_i\arctan(2^{-i})$$

can be modified as follows:

$$Z_{i+1}=Z_i-d_i 2^{-i}.$$

In this manner, a lookup table is not needed for storing arctan($2^{-i}$) values in the binary base to perform the accumulation. In addition, for each iteration, only the φ(i) bit needs to be saved and the resulting φ(i) bits become the output θ in the binary arctangent base.

In general, a monotonically increasing relationship between the θ values in the binary arctangent base and the θ values in the binary base exists. Nevertheless, "gaps" in θ values in the binary arctangent base are present as the input vector (Cb, Cr) circles around the origin. To remove those "gaps" and to make the θ values in the binary arctangent base continuous, the output ρ, θ adjust module 230 performs certain adjustments on the output θ 240 according to a version of the present invention.

Figure 7:
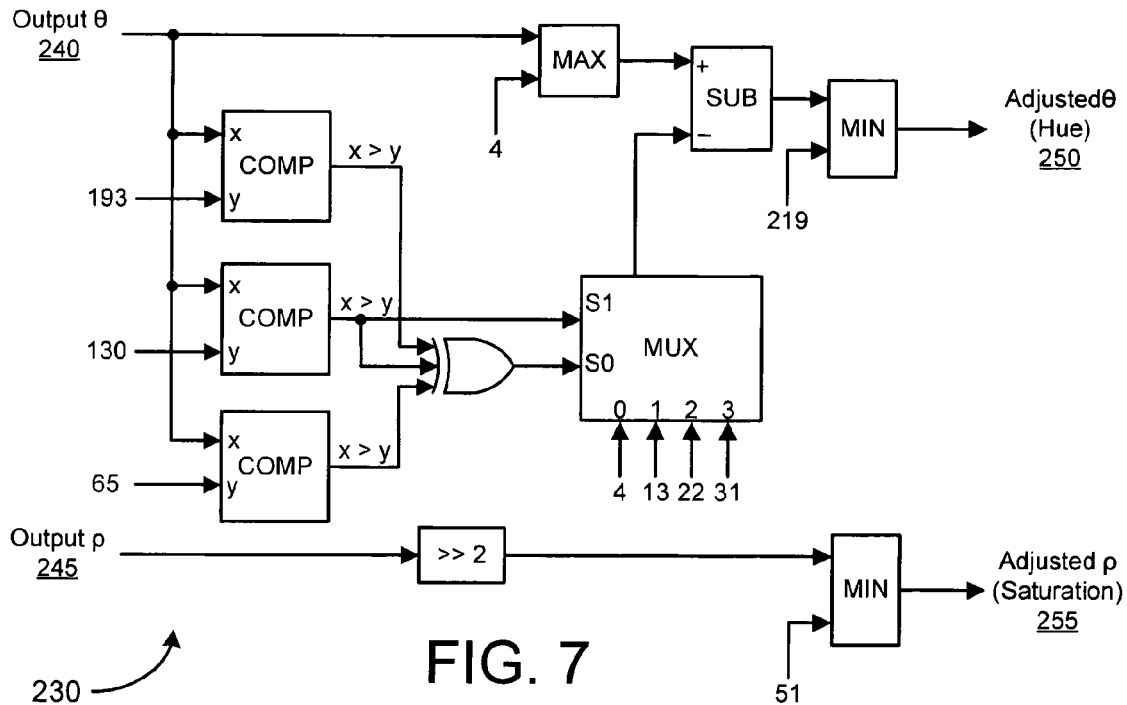
FIG. 7 is a block diagram of the output adjust module according to a version of the present invention.

FIG. 7 is a block diagram of the output adjust module 230 according to a version of the present invention. The output adjust module 230 removes the "gaps" in the output θ 240 values in order to save memory space in subsequent lookup tables. For example, in one version where the output θ value 240 is in 8-bit binary arctangent representation having values between zero (0) and 255, the output adjust module 230 limits the minimum adjusted θ value 250 to 4, and then to the following conditional subtraction:

If $\theta_{Output} \leq 65$, then
$\theta_{Adjusted} = \theta_{Output} - 4$;
If $65 < \theta_{Output} \leq 130$, then
$\theta_{Adjusted} = \theta_{Output} - 13$;
If $130 < \theta_{Output} \leq 193$, then
$\theta_{Adjusted} = \theta_{Output} - 22$;
If $193 < \theta_{Output}$, then
$\theta_{Adjusted} = \theta_{Output} - 31$.

The output adjust module 230 then limits the maximum value of the adjusted θ 250 to be 219. As for the output ρ value 245, the adjust module 230 divides the value by four (4) and limits its maximum value to be 51. Those skilled in the art would readily appreciate that the parameters used above are exemplary and that the principles discussed are not limited to those parameters in any way.

The output adjust module 230 outputs the adjusted θ value (hue) 250 and adjusted ρ value (saturation) 255 corresponding to the input chrominance data, Cb and Cr 102. Referring again to FIG. 2, the hue 250 and saturation 255 values are then received by the color adjustment decision module 300. As stated above, the color adjustment decision module 300 automatically determines how much, if at all, the hue 250 and/or saturation 255 should be altered. In a preferred embodiment, the color adjustment decision module 300 partitions the color space of the input video signal into a plurality of color tone regions defined on the two-dimensional color space indexed by color hue (θ) and color saturation (ρ). The color adjustment decision module 300 then independently controls each color tone region according to predetermined rules by using predetermined lookup tables defined for each color tone region.

Figure 8:
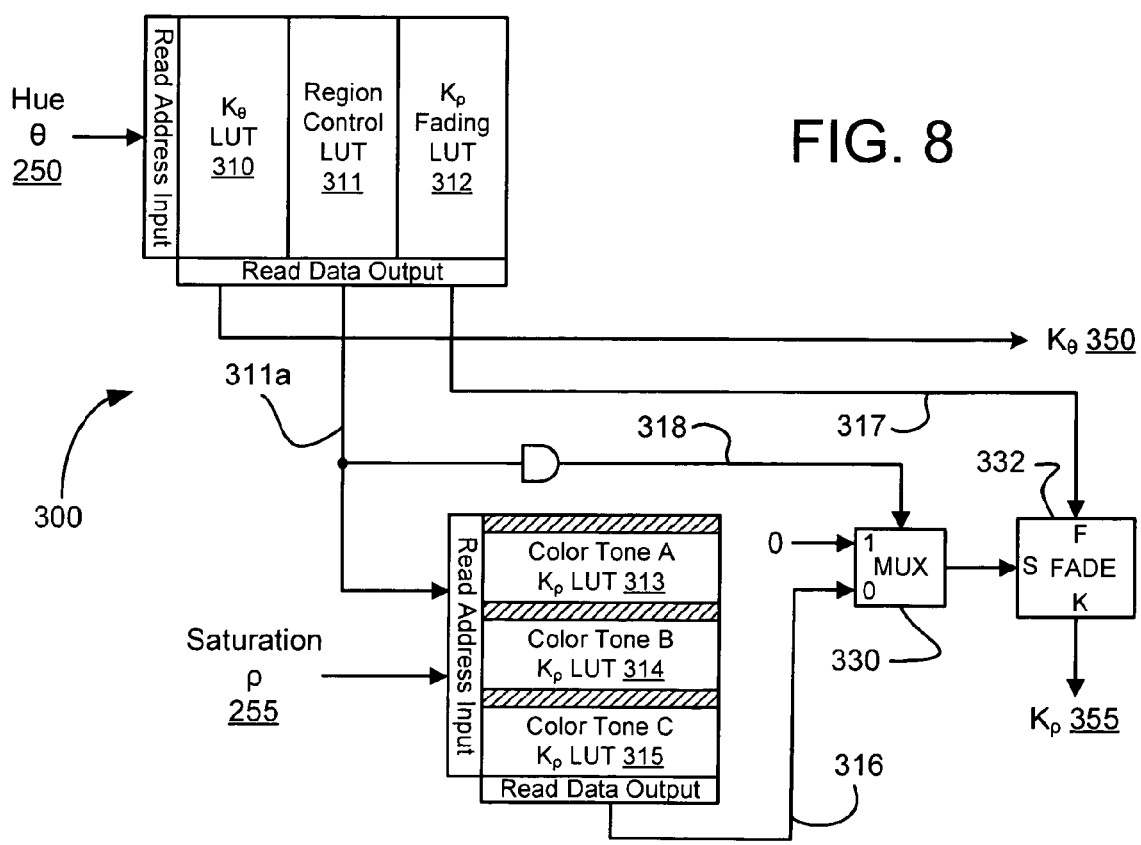
FIG. 8 is a block diagram of the color adjustment decision module according to a version of the present invention.

FIG. 8 is a block diagram of the color adjustment decision module 300 according to a version of the present invention. As is shown, the decision module 300 includes a plurality of lookup tables 310-315. The hue 250 and saturation 255 values are used to perform a lookup on at least one of the tables 310-315 to determine the hue adjustment, $K_\theta$ (350) and the saturation adjustment, $K_\rho$ (355) values, which are then outputted.

In a preferred embodiment, the lookup tables 310-315 can be separated into at least two general categories. A first group of lookup tables 310-312 can be associated with the hue 250 and a second group of lookup tables 313-315 can be associated with the saturation 255. In one version, the hue lookup tables 310-312 are indexed according to hue 250, and include at least one $K_\theta$ lookup table (LUT) 310, a region control LUT 311, and a saturation fading LUT 312. The $K_\theta$ LUT 310 correlates $K_\theta$ values 350 with hue 250.

The region control LUT 311 specifies in which one of the plurality of color tone regions the hue 250 falls. For example, the θ-ρ color plane can be partitioned into four predetermined color tone regions, e.g., blue, green, skin tone, and all other tones, and the hue 250 can be associated with one color tone region. The region control LUT 311 correlates the hue value 250 to a region control output 311a, which indicates the color tone region and is used by the saturation LUTs 313-315 to determine which of the saturation LUTs 313-315 are applicable. The saturation fading LUT 312 correlates the hue 250 with a fade factor 317 that is inputted into a fade module 332. The fade module 332 will be discussed in more detail below with respect to the saturation adjustment value $K_\rho$ 355.

Those with ordinary skill in the art would readily recognize that other types of LUTs can be associated with the hue value 250. Accordingly, the number and types of LUTs associated with the hue value 250 need not be limited to those described above.

While the hue LUTs 310-312 are indexed according to hue 250, the saturation LUTs 313-315 are indexed according to the saturation value 255 and the region control output value 311a. In one version, the saturation LUTs 313-315 include at least one LUT for each of the plurality of predetermined color tone regions. As stated above, the region control output 311a indicates which of the plurality of color one regions is relevant based on the hue value 250. Accordingly, the saturation value 255 and the region control output 311a are used to perform a lookup on the saturation LUT 313-315 corresponding to the appropriate color tone region. In one version, the saturation LUTs 313-315 can be combined in a single LUT. Lookup values for each distinct color tone region can be defined in a contiguous block of entries, thereby conserving memory and hardware resources.

The output 316 from the saturation LUT 313-315 is used to generate the saturation adjustment value $K_\rho$ 355. In one version, a multiplexer 330 receives the output 316 and a bit value 318 based on the region control output 311a. If the region control output 311a indicates that the hue 250 is not located in any of the predetermined color tone regions, then the bit value 318 will be one (1) and the output of the multiplexer 330 will be zero (0), and the saturation adjustment $K_\rho$ will also be zero (0). Otherwise, the bit value 318 is zero (0) and the output 316 from the saturation LUTs 313-315 is outputted by the multiplexer 330.

According to another version, the fade module 332 receives the output from the multiplexer 330 and the fade factor 317 outputted from the saturation fading LUT 312. The fade module 332 utilizes the fade factor 317 to adjust the saturation LUT output 316 in the following manner:

$K_\rho K = S \times (F+1) >> 4$, where S denotes the output of the multiplexer 330, F denotes the fade factor 317, and K denotes the output of the fade module 332.

In this manner, the fade module 332 can fade out the saturation adjustment value $K_\rho$ 355 at the boundaries between each of the plurality of predetermined color tone regions (e.g., blue, skin, and green) and the rest of the θ-ρ color plane. The reason for implementing this fading out process is to "smoothen" $K_\rho$ 355 across the boundaries between the plurality of predetermined color tone regions and the rest of the color plane. Without such fading, abrupt changes in $K_\rho$ 355 along any trajectory on the θ-ρ color plane can exist, and the outputted video signal can exhibit abrupt color changes while the input video exhibits only gradual color changes. Such abrupt color changes in the output video signal result in contouring effects in the displayed video which are highly objectionable. By fading the $K_\rho$ 355 in the manner described above, the contouring effects can be substantially eliminated.

The color adjustment decision module 300 outputs the hue adjustment value $K_\theta$ 350 and saturation adjustment value $K_\rho$ 355 corresponding to the hue 250 and saturation 255 values associated with the input chrominance data, Cb and Cr 102. Referring again to FIG. 2, $K_\theta$ 350 and $K_\rho$ 355 values are then received by the color adjustment module 400. As stated above, the color adjustment module 400 retrieves from the buffer 110 the chrominance data 102 with which $K_\theta$ 350 and $K_\rho$ 355 are associated and applies $K_\theta$ 350 and $K_\rho$ 355 directly to the chrominance data 102 according to an adjustment algorithm. In one version, the adjustment algorithm is:

$$Cb'=Cb+(K_\rho \times Cb)-(K_\theta \times Cr)$$

$$Cr'=Cr+(K_\rho \times Cr)+(K_\theta \times Cb).$$

The resulting adjusted chrominance data 120, Cb' and Cr', for the pixel are then outputted.

Figure 9:
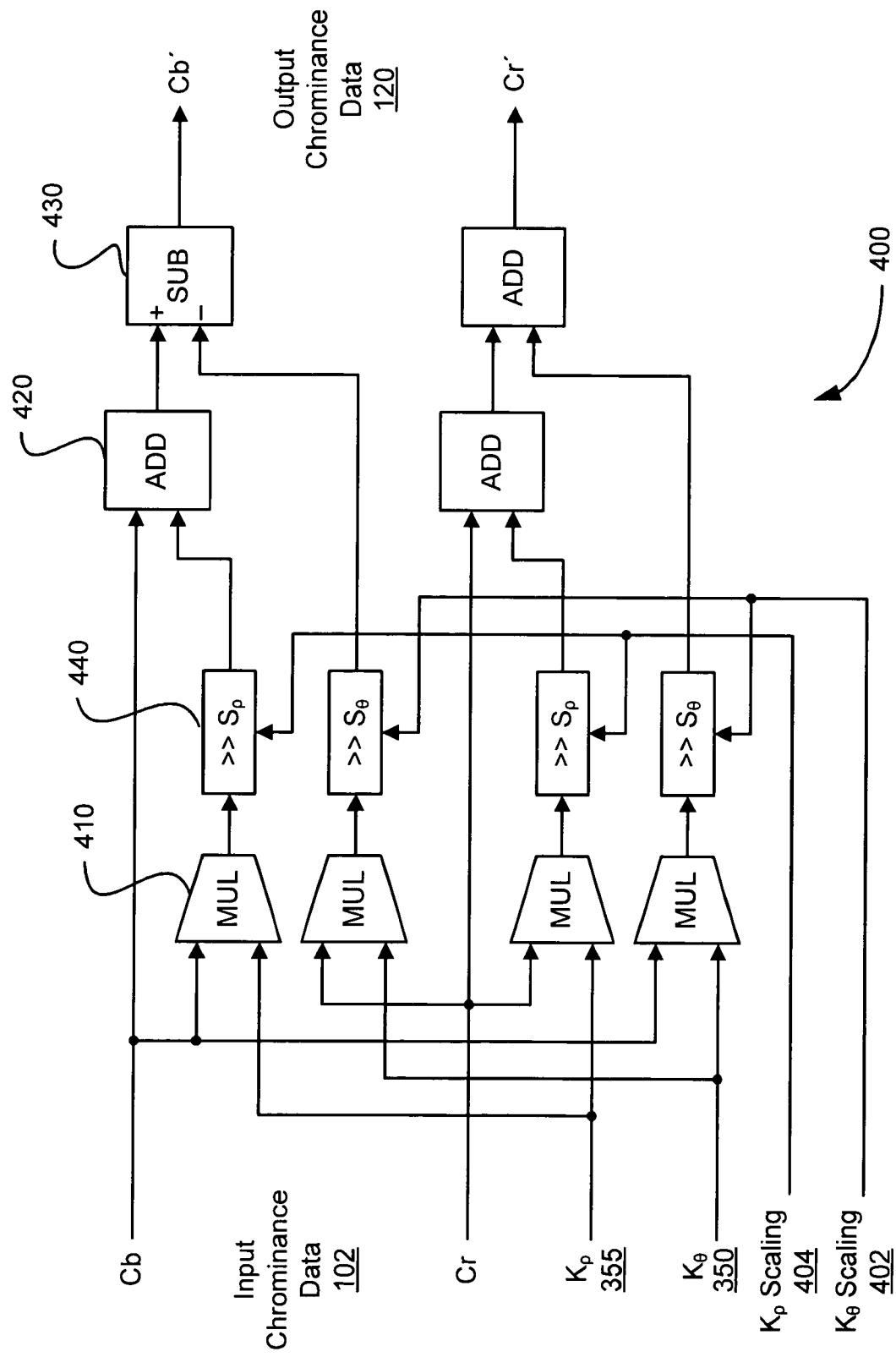
FIG. 9 is a block diagram of the color adjustment module according to a version of the present invention.

FIG. 9 is a block diagram of the color adjustment module 400 according to a version of the present invention. The adjustment module 400 includes a plurality of multipliers 410 for multiplying $K_\theta$, $K_\rho$, Cb and Cr with one another, and a plurality of add modules 420 and subtract modules 430 to perform the adjustment algorithm.

In one version the color adjustment module 400 also includes a plurality of shifting modules 440 that receive scaling bits 402, 404 corresponding to θ and ρ. The shifting modules 440 are needed because $K_\theta$ 350 and $K_\rho$ 355 are typically fractional numbers and therefore, integer multiplication followed by suitable shifting is necessary to realize multiplications with fractional numbers. According to this version, the scaling bits, $K_\theta$ Scaling 402 and $K_\rho$ Scaling 404, are two preset bits to control the range and resolution of $K_\theta$ 350 and $K_\rho$ 355, respectively. Specifically, if $K_\theta$ Scaling 402 is zero (0), then $S_\theta$=6, otherwise $S_\theta$=7. If $K_\rho$ Scaling 404 is zero (0), then $S_\rho$=6, otherwise $S_\rho$=7. With the shifting, the adjustment algorithm becomes:

$$Cb'=Cb+(K_\rho \times Cb)>>S_\rho-(K_\theta \times Cr)>>S_\theta$$

$$Cr'=Cr+(K_\rho \times Cr)>>S_\rho+(K_\theta \times Cb)>>S_\theta$$

According to versions of the present invention, the color management module 100 enhances the quality of a color video input by adjusting and correcting the color hue and color saturation of the pixel input data according to predetermined rules for a plurality of color tone regions. According to an aspect of the present invention, the color space of the input video signal is partitioned into a plurality of color tone regions defined on the two-dimensional color space indexed by color hue and color saturation calculated using a computation-efficient algorithm. The color values of a pixel data in each color tone region are individually controlled and adjusted according to the predetermined rules by using predetermined lookup tables defined for each color tone region. In a preferred embodiment, the color management module 100 adjusts the color values of the pixel data directly in the format in which it is transmitted, e.g., (Y, Cb, Cr) or (Y, U, V), thereby avoiding any loss of resolution resulting from coordinate conversions.

In another aspect of the present invention, the color attributes of the pixel data are analyzed by converting the chrominance data (Cb, Cr) of the input pixel data from Cartesian coordinates to polar coordinates in the form of a vector phase angle (θ) in binary arctangent base representing the color hue and a scaled vector magnitude (ρ) representing the color saturation. The conversion is performed using a modified CORDIC algorithm, which efficiently performs the coordinate conversion by VLSI hardware. By converting the chrominance data from color difference values to hue and saturation values, the color of the input pixel data can be suitably analyzed and adjusted in terms of its hue and saturation properties, which are more easily perceived and interpreted by humans.

Moreover, the modified CORDIC algorithm according to the present invention is used for analyzing the color attributes of the input pixel data, while the adjustment algorithm according to the present invention is used for adjusting the color attributes of the input pixel data. Hence, the number of iterations performed by the modified CORDIC algorithm can be reduced because the required resolution for analyzing the color attributes of the input pixel data is less than the required resolution for adjusting the color attributes. Typically, the required resolution for adjusting must be high enough to prevent any loss of resolution in the output pixel data, while the required resolution for analyzing can be lower for deciding the degree of the color hue and color saturation adjustment. With such a reduction in the required resolution for analyzing, the hardware costs and/or computation time can be reduced without compromising the overall performance of the color hue and color saturation adjustment quality.

In another version of the present invention, the luminance portion, Y, of the input pixel data can also be automatically adjusted and modified simultaneously with color hue and saturation adjustment, according to the calculated color hue θ and color saturation ρ values in addition to the input luminance value Y.

The color management module 100 can be incorporated into any display system that performs image signal processing, such as an image capture device, printer, or television display system. For example, the color management module 100 can be coupled to a de-interlacer in a television display system, where the de-interlacer converts an interlaced video signal into a progressive scanned video signal which is displayed to a viewer.

Figure 10:
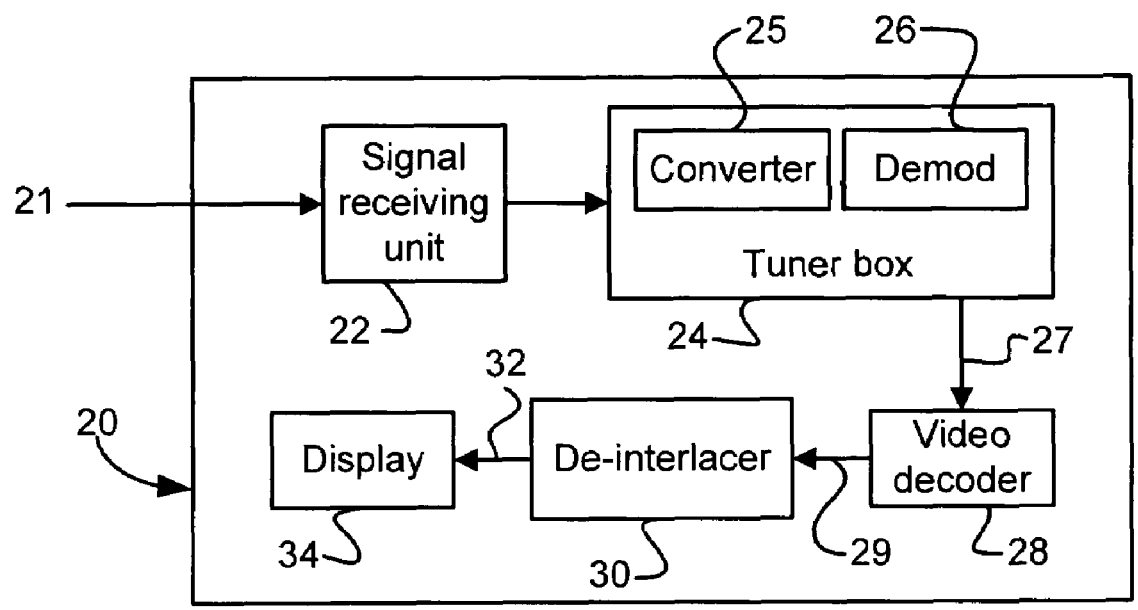
FIG. 10 depicts an exemplary display system according to a version of the present invention.

FIG. 10 depicts an exemplary display system according to a version of the present invention. As is shown the display system 20 includes a signal receiving unit 22 that is coupled to a tuner box 24, and a video decoder 28. Signals 21, such as television signals, are captured by the signal receiving unit 22 and transmitted to the tuner box 24. The tuner box 24 includes a converter 25 and a demodulation unit 26 that transforms the incoming signal into an analog signal. The analog signal 27 is received by the video decoder 28, which outputs an interlaced video signal 29. The de-interlacer 30 converts the interlaced video signal 29 into a progressive video output signal 32. The progressive video output signal 32 is then displayed via an LCD or PDP 34. In a preferred embodiment, the de-interlacer 30 is that described in co-pending U.S. application Ser. No. 11/019,017, filed Dec. 20, 2004 and entitled "METHOD AND APPARATUS FOR PER-PIXEL MOTION ADAPTIVE DE-INTERLACING OF INTERLACED VIDEO FIELDS," the entirety of which is herein incorporated by reference.

The color management module 100 can either receive the chrominance data 102 of the pixel data from the video decoder 28 as an interlaced video signal 29, or from the de-interlacer 30 as the progressive video output signal 32. Moreover, the input video signal can have different color sub-sampling formats such as 4:4:4 and 4:2:2 without affect the quality of the color adjustment.

The present invention has been described with reference to certain preferred versions. Nevertheless, other versions are possible. For example, the number of lookup tables used to determine $K_\theta$ and $K_\rho$ can vary. Further, alternative steps equivalent to those described for the color enhancement process can also be used in accordance with the parameters of the described implementations, as would be apparent to one of ordinary skill. Therefore, the spirit and scope of the appended claims should not be limited to the description of the preferred versions contained herein.

What is claimed is:

1. A method for automatically adjusting chrominance data of an input pixel from a color video signal, the method comprising:

receiving and temporarily storing the chrominance data of the input pixel, wherein the chrominance data is received and stored in a transmission format comprising a color difference representation;

converting the chrominance data from the color difference representation in Cartesian coordinates to color hue and color saturation representation in polar coordinates such that color attributes of the input pixel can be analyzed according to hue and saturation values;

determining a hue adjustment value and a saturation adjustment value based on the color hue value and color saturation value associated with the chrominance data, wherein determining the hue adjustment and saturation adjustment includes:

partitioning a color space of the color video signal into a plurality of color tone regions defined on a color space indexed by color hue and color saturation;

for each of the plurality of color tone regions, defining at least one lookup table; and using the color hue and color saturation values to perform at least one lookup in at least one lookup table associated with the color tone region corresponding to the color hue value, wherein each of the plurality of color tone regions can be independently defined and controlled by the associated lookup table;

applying the hue adjustment and the saturation adjustment directly to the chrominance data in its transmission format; and outputting the adjusted chrominance data to an output color video signal.

2. A method according to claim 1 wherein converting the chrominance data includes:

using a modified CORDIC algorithm to convert the chrominance data in Cartesian coordinates to the hue and the saturation values in polar coordinates, wherein hue is represented by a vector phase angle, $\theta$, in binary arctangent base and saturation is represented by a scaled vector magnitude, $\rho$.

3. A method according to claim 2 wherein the color difference representation is Cb and Cr.

4. A method according to claim 3 further including swapping a Cb value and a Cr value to shift a discontinuity in a $\theta$-$\rho$ polar coordinate color plane prior to using the modified CORDIC algorithm.

5. A method according to claim 4 further including:

after converting (Cb, Cr) in Cartesian coordinates to ($\theta$, $\rho$) in polar coordinates, adjusting $\theta$ to make the $\theta$ values in the binary arctangent base continuous.

6. A method according to claim 1 wherein determining the hue adjustment and saturation adjustment further includes:

fading the saturation adjustment at boundaries between each of the plurality of color tone regions and the remaining portion of the color space.

7. A method of claim 1 wherein the chrominance data is temporarily stored in a buffer and the method further includes retrieving the chrominance data from the buffer prior to applying the hue adjustment and saturation adjustment directly to the chrominance data.

8. A color management module for automatically adjusting chrominance data of an input pixel from a color video signal, the system comprising:

a buffer for receiving and temporarily storing the chrominance data of the input pixel, wherein the chrominance data is received and stored in a transmission format comprising a color difference representation;

a conversion module for converting the chrominance data from the color difference representation in Cartesian coordinates to color hue and color saturation representation in polar coordinates such that color attributes of the input pixel can be analyzed according to hue and saturation values, wherein the conversion module includes a plurality of Cordic stages coupled in series, wherein the plurality of Cordic stages reform a modified CORDIC algorithm to convert the chrominance data in Cartesian coordinates to the hue and the saturation values in polar coordinates, wherein hue is represented by a vector phase angle, $\theta$, in binary arctangent base and saturation is represented by a scaled vector magnitude, $\rho$;

a decision module coupled to the conversion module for determining a hue adjustment value and a saturation adjustment value based on the color hue value and color saturation value associated with the chrominance data; and an adjustment module coupled to the buffer and to the decision module for applying the hue adjustment value and the saturation adjustment value directly to the chrominance data in its transmission format and for outputting the adjusted chrominance data to an output color video signal.

9. A system according to claim 8 wherein the color difference representation is Cb and Cr.

10. A system according to claim 9 wherein the conversion module further includes a swap block for swapping a Cb value and a Cr value to shift a discontinuity in a $\theta$-$\rho$ polar coordinate color plane.

11. A system according to claim 10 wherein the conversion module further includes an output adjust module that adjusts a $\theta$ value to make the $\theta$ values in the binary arctangent base continuous.

12. A system according to claim 8 wherein the decision module includes a plurality of lookup tables, wherein at least one lookup table is associated with each of a plurality of color tone regions such that each color tone region can be independently defined and controlled by the associated lookup table.

13. A system according to claim 12 wherein the decision module further includes a fade module that fades the saturation adjustment at boundaries between each of the plurality of color tone regions and the remaining portion of the color space.

14. A progressive scan display system comprising:

a signal receiving unit;

a tuner box for transforming the signal into an analog signal;

a video decoder for transforming the analog signal into a plurality of interlaced video fields, wherein each video field comprises a plurality of pixels and each pixel is defined by a luminance value and chrominance data based on color differences;

a de-interlacing system for converting the interlaced video fields into a progressive video signal;

a color management module for adjusting the chrominance data of an input pixel from a video signal, the module comprising:

a buffer for receiving and temporarily storing the chrominance data of the input pixel, wherein the chrominance data is received and stored in a transmission format comprising a color difference representation;

a conversion module for converting the chrominance data from the color difference representation in Cartesian coordinates to color hue and color saturation representation in polar coordinates such that color attributes of the input pixel can be analyzed according to hue and saturation values;

a decision module coupled to the conversion module for determining a hue adjustment value and a saturation adjustment value based on the color hue value and color saturation value associated with the chrominance data, wherein the decision module includes a plurality of lookup tables, wherein at least one lookup table is associated with each of a plurality of color tone regions such that each color tone region can be independently defined and controlled by the associated lookup table; and an adjustment module coupled to the buffer and to the decision module for applying the hue adjustment value and the saturation adjustment value directly to the chrominance data in its transmission format and for outputting the adjusted chrominance data to an output color video signal; and a display for displaying the progressive video signal.

* * * * *

UNITED STATES PATENT AND TRADEMARK OFFICE
CERTIFICATE OF CORRECTION

| | |
|---|---|
| PATENT NO. | : 7,483,082 B2 |
| APPLICATION NO. | : 11/112816 |
| DATED | : January 27, 2009 |
| INVENTOR(S) | : Chih-Hsien Chou |

Page 1 of 1

It is certified that error appears in the above-identified patent and that said Letters Patent is hereby corrected as shown below:

COLUMN 14, LINES 6-7, cancel the text "the plurality of Cordic stages reform a modified CORDIC algorithm," and replace with the text, "the plurality of Cordic stages perform a modified CORDIC algorithm."

Signed and Sealed this

Thirty-first Day of March, 2009

JOHN DOLL
*Acting Director of the United States Patent and Trademark Office*